(12) United States Patent
Furusawa

(10) Patent No.: US 7,986,812 B2
(45) Date of Patent: Jul. 26, 2011

(54) ON-VEHICLE CAMERA WITH TWO OR MORE ANGLES OF VIEW

(75) Inventor: Isao Furusawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 989 days.

(21) Appl. No.: 11/835,991

(22) Filed: Aug. 8, 2007

(65) Prior Publication Data

US 2008/0056537 A1 Mar. 6, 2008

(30) Foreign Application Priority Data

Aug. 31, 2006 (JP) .................. 2006-234835

(51) Int. Cl.
*G06K 9/00* (2006.01)
(52) U.S. Cl. .................... 382/104; 348/208.99
(58) Field of Classification Search .......... None
See application file for complete search history.

(56) References Cited

U.S. PATENT DOCUMENTS

| 7,414,664 | B2 * | 8/2008 | Suda | 348/341 |
| 7,423,671 | B2 * | 9/2008 | Kiso | 348/218.1 |
| 7,532,235 | B2 * | 5/2009 | Wang | 348/207.99 |
| 2002/0030735 | A1 * | 3/2002 | Yamada | 348/47 |
| 2002/0159032 | A1 * | 10/2002 | Son et al. | 352/69 |
| 2005/0088546 | A1 * | 4/2005 | Wang | 348/239 |
| 2008/0056537 | A1 * | 3/2008 | Furusawa | 382/104 |

FOREIGN PATENT DOCUMENTS

| EP | 1 288 618 A2 | 3/2003 |
| EP | 1 345 420 A2 | 9/2003 |
| EP | 1 434 441 A1 | 6/2004 |
| EP | 1 662 459 A1 | 5/2006 |
| JP | 2001-333422 A | 11/2001 |
| JP | 2003-348441 A | 12/2003 |
| JP | 2004-40432 A | 2/2004 |
| JP | 2004-48295 A | 2/2004 |
| JP | 2006-166294 A | 6/2006 |
| WO | WO 01/38825 A1 | 5/2001 |
| WO | WO 2006/055541 A2 | 5/2006 |

OTHER PUBLICATIONS

Japanese Office Action dated Oct. 14, 2008 with partial English translation (Three (3) pages).
European Search Report dated May 7, 2010 a partial English translation (Four (4) pages).
European Search Report dated Oct. 29, 2007 (seven (7) pages).

* cited by examiner

*Primary Examiner* — Bhavesh M Mehta
*Assistant Examiner* — Tahmina Ansari
(74) *Attorney, Agent, or Firm* — Crowell & Moring LLP

(57) ABSTRACT

A camera with two or more angles of view is disclosed. An imaging processing for a first application is carried out at a first angle of view on the same image data, and the imaging processing for a second application is carried out at a second angle of view different from the first angle of view on the same image data, the first and second image processing being carried out in the same period. To achieve this object, the same screen is divided into a plurality of screens having a plurality of angles of view, and the image processing for a plurality of applications is carried out using any one of the screens with the angles of view divided, the plurality of the applications being processed in the same period.

5 Claims, 9 Drawing Sheets

LONGITUDINAL EDGE

LINEAR CANDIDATES

VEHICLE DETECTION IMAGE

201

PEDESTRIAN DETECTION ANGLE OF VIEW

PEDESTRIAN DETECTION ANGLE OF VIEW

VEHICLE DETECTION ANGLE OF VIEW

201

LANE DETECTION ANGLE OF VIEW

AREA A

AREA B

201

GAMMA CORRECTION OF AREA A

GAMMA CORRECTION OF AREA B

AREA A

AREA B

201

FILTER CHARACTERISTIC OF AREA A

FILTER CHARACTERISTIC OF AREA B

ON-VEHICLE CAMERA WITH TWO OR MORE ANGLES OF VIEW

BACKGROUND OF THE INVENTION

This invention relates to a method and an apparatus for realizing an on-vehicle camera application requiring different angles of view.

The cameras mounted on the vehicle include a back monitor camera and a lane detecting camera for detecting the lanes ahead of the vehicle. These cameras are used to monitor the situation behind the vehicle and to detect by imaging the lanes ahead of the vehicle, respectively, and therefore, with only one angle of view required, generally uses a fixed focus lens.

On the other hand, a plurality of applications including the obstacle detection in addition to the lane detection are expected to be mounted on the vehicle as a technique to secure the vehicle safety. These applications require images of different angles of view suited to the respective purposes, and therefore, the on-vehicle camera is required to pick up an image at a plurality of angles of view. In lane detection, for example, the detection of the lanes in the vicinity of the own vehicle is required and therefore, requires a wider angle of view, while the obstacle detection requires a narrower angle of view than the lane detection to detect an obstacle distant from the vehicle.

A conventional technique for picking up an image at a plurality of angles of view with a single camera is disclosed in JP-A-2004-48295 in which the camera is equipped with a zoom mechanism which narrows the imaging range to improve the accuracy of detection of the situation in the neighborhood of the vehicle when the vehicle is stationary, and widens the imaging range to reduce the dead angle when the vehicle is running.

SUMMARY OF THE INVENTION

In the aforementioned related art using the zoom mechanism, the camera increases in size and so does the cost. Another problem is that the simultaneous execution of a plurality of applications is not presupposed. In the case where the lane detection and the obstacle detection are carried out at the same time, therefore, the process of widening the angle of the zoom mechanism to pick up the image for lane detection and then switching to a narrow angle to pick up the image for obstacle detection is repeated, often resulting in a longer processing period. This poses an especially serious problem for vehicle applications which require the real-time control operation.

This invention has been achieved to solve the aforementioned problems, and the object thereof is to provide an apparatus and a method for simultaneously processing the applications of the on-vehicle camera having different required angles of view.

In order to achieve this object, according to a first aspect of the invention, there is provided a camera with plural angles of view, wherein with regard to the same image data, the image processing for a first application is carried out with a first angle of view, and the image processing for a second application is carried out with a second angle of view different from the first angle of view, the first and second image processing being carried out in the same period.

According to a second aspect of the invention, there is provided a camera with plural angles of view, wherein the same screen is divided into a plurality of screens with a plurality of angles of view, the image processing for a plurality of applications are carried out using any of the screens with the plurality of angles of view in the same period.

According to this invention, therefore, a plurality of applications having a plurality of different required angles of view can be executed at the same time. Also, the cost and the processing time of the apparatus are reduced.

Other objects, features and advantages of the invention will become apparent from the following description of the embodiments of the invention taken in conjunction with the accompanying drawings.

DETAILED DESCRIPTION OF THE EMBODIMENTS

Now, embodiments of the invention are explained in detail with reference to the drawings.

Embodiment 1

Figure 1:
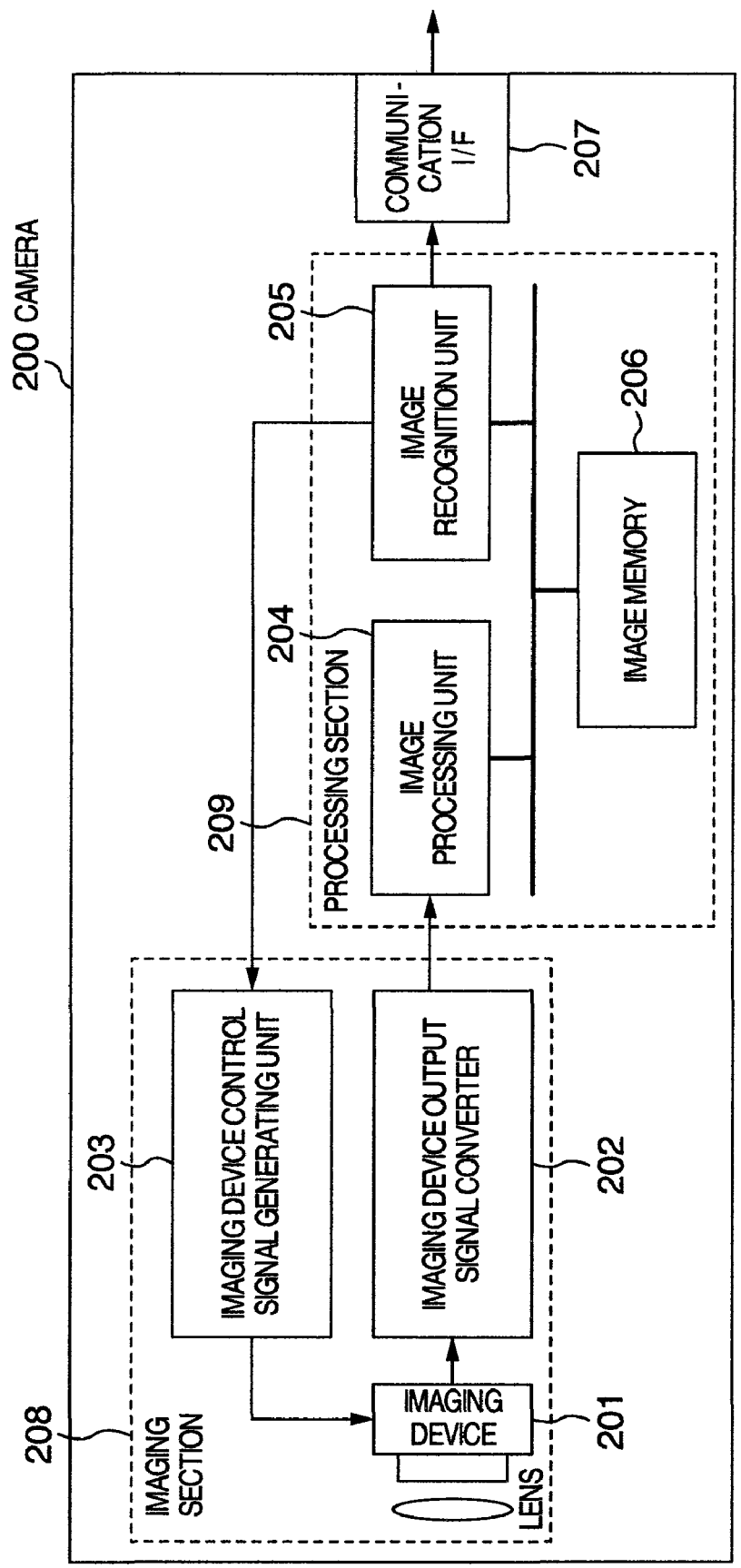
FIG. 1 is a basic block diagram showing an image processing camera according to an embodiment of the invention.

FIG. 1 is a block diagram showing the basic configuration of this embodiment. A camera 200 is mounted on the ceiling of the vehicle compartments to pick up the image ahead of the vehicle. The camera 200 includes an imaging section 208 to pick up an image and a processing section 209 to process the image and execute the recognition process. In the imaging section 208, an image of the lanes and vehicles ahead of the own vehicle is picked up with an imaging device 201 via a lens or a lens system. The analog data sent from the imaging device 201 is converted into digital data (hereinafter referred to as the image data) by an imaging device output signal converter 202 and the resulting image data is transmitted to the data processing section 209.

An image processing unit 204 is explained below. The image processing unit 204 has the function of storing the image data from the imaging device output signal converter 202 in an image memory 206 and the function of subjecting the image data to the image processing (for example, the Sobel filter processing) in accordance with the instruction from the image recognition unit 205 and storing the result thereof again in the image memory 206.

The processing section 209 stores the image data from the imaging device output signal converter 202 in the image memory 206. An image recognition unit 205 issues an image processing command to the image processing unit 204 as required. The image processing unit 204, in order to carry out the designated process, subjects the image data stored in the image memory 206 to the image processing, and stores the image processing result again in the image memory 206. The image recognition unit 205 executes the recognition process for lane detection from the image processing result stored in the image memory 206, and through a communication I/F (interface) 207, transmits the recognition result to other units not shown.

Figure 2:
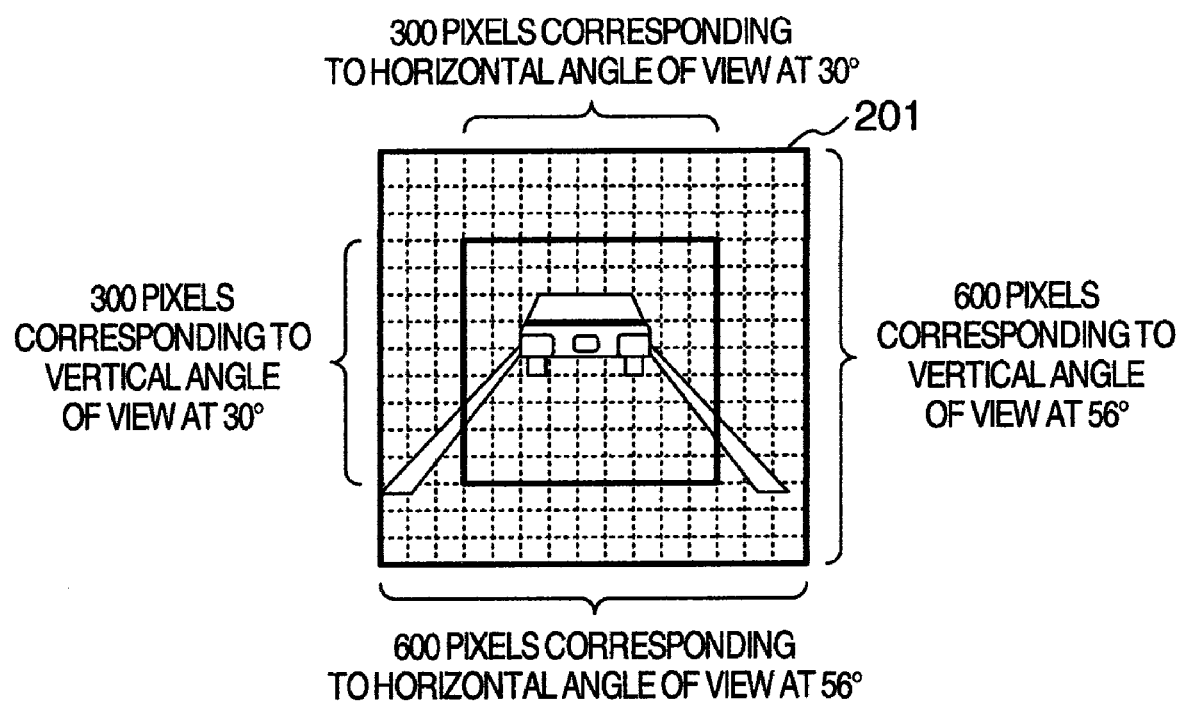
FIG. 2 shows first and second angles of view of an image processing camera according to an embodiment of the invention.

FIG. 2 shows an example of the imaging device 201 used in this embodiment. The imaging device 201 is configured of square pixels including 600 effective pixels in horizontal direction and 600 effective pixels in vertical direction. An image with an angle of view at 56 degrees is displayed on the effective pixels of the imaging device 201. The lane detection process, to detect the lanes more stably at a position near the vehicle than at a position far from the vehicle, uses a wide-angle image having the angle of view at 56 degrees, while the vehicle detection process uses a narrow-angle image having the angle of view at 30 degrees because of the need to detect the vehicles far ahead of the own vehicle. The angle of view at about 30 degrees is obtained by 300 pixels. Therefore, the vehicle detection process uses the area of 300 horizontal pixels and 300 vertical pixels at the central pat of the screen.

Figure 3:
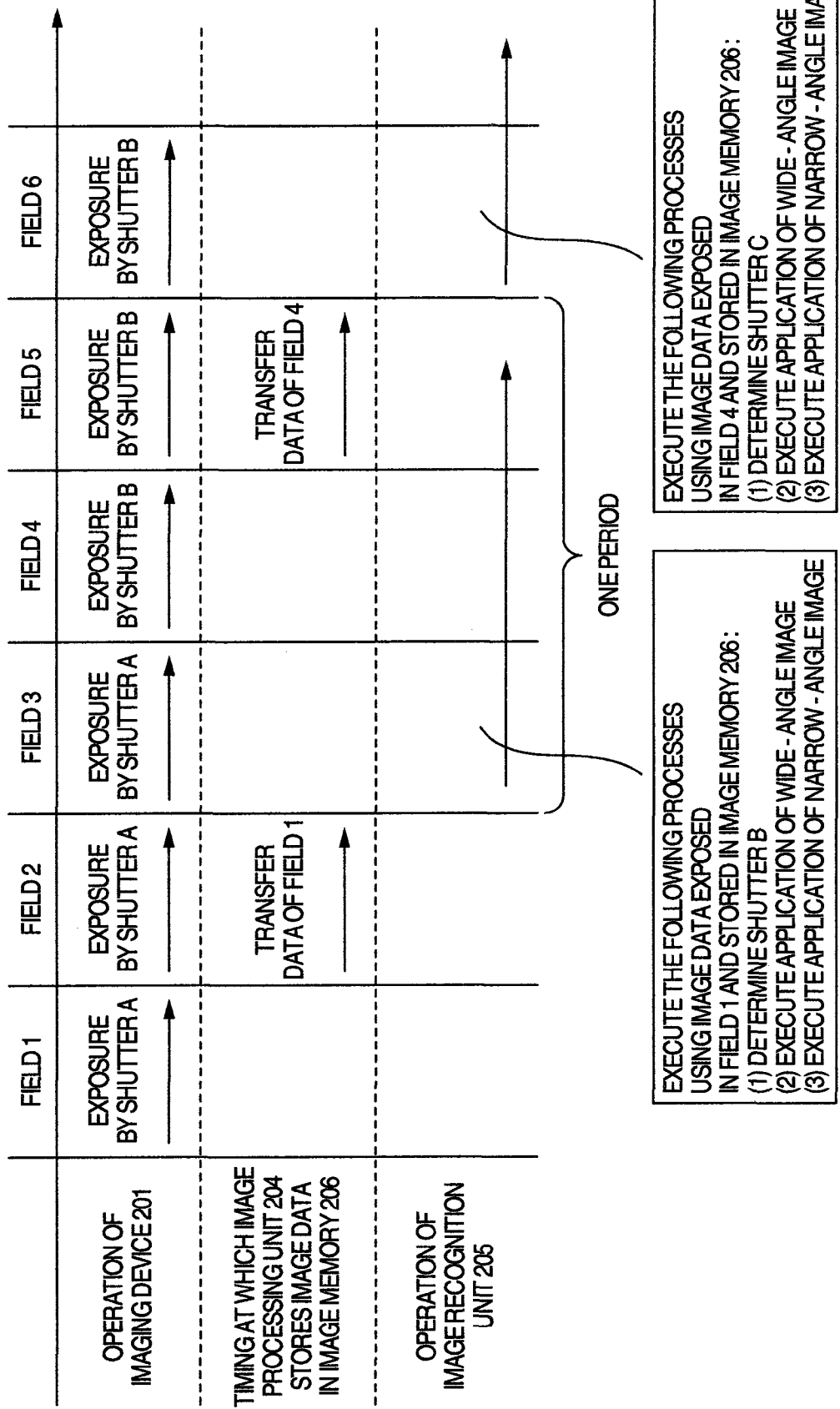
FIG. 3 shows an example of the timing chart from exposure to image processing.

FIG. 3 is a timing chart for the process from exposure to image recognition. In field 1, exposure is carried out by a shutter A of the imaging device 201, and in FIG. 2, the image processing unit 204 stores in the image memory 206 the image data (hereinafter referred to as "the image data A") exposed in field 1 and transmitted from the imaging device output signal converter 202. In field 3, the image processing unit 204 determines the next shutter B using the data stored in the image memory 206, and executes the lane detection process and the vehicle detection process at different required angles of view on the image data A. In similar fashion, in field 4, the exposure is effected by the shutter B of the imaging device 201, and in field 5, the image processing unit 204 stores in the image memory 206 the image data (hereinafter referred to as "the image data B") exposed in field 4 and transmitted from the imaging device output signal converter 202. In field 5, the next shutter C is determined using the data stored in the image memory 206, and the lane detection process and the vehicle detection process are executed on the image data B at different required angles of view. After that, the process from field 3 to field 5 as one period is repeated.

Figure 4:
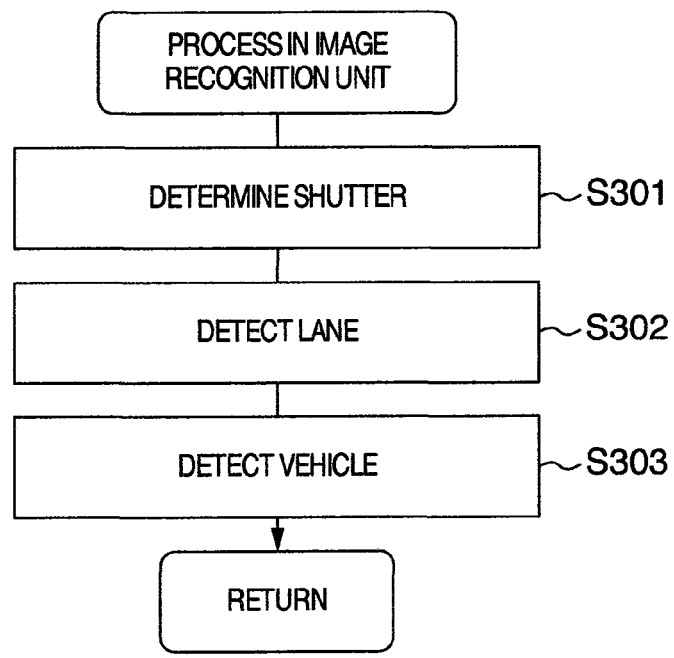
FIG. 4 is a general flowchart for the image recognition unit.

FIG. 4 is a general flowchart for the image recognition unit 205. In step S301, the brightness of the image data stored in the memory memory 206 is determined, and a shutter value making sure that the next image to be fetched has the proper brightness is determined. Then, a corresponding instruction is given to the imaging device control signal generating unit 203. The imaging device control signal generating unit 203 reflects the designated shutter value in the imaging device 201 from the next field. The image data having the pixels in the number of 600×600 with the angle of view at 56 degrees are stored in the image memory 206. In step S302, therefore, the lane detection process is executed using the image having the angle of view at 56 degrees. Next, in step S303, the vehicle detection process is executed using the image data of the central 300×300 pixels having the angle of view at 30 degrees among the whole image data stored in the image memory 206.

In this way, the image data portion having an angle of view suited to each application is cut out and processed from one image data, and therefore, a target (lane for lane detection or vehicle for vehicle detection) using a plurality of angles of view can be detected for the image data acquired at the same timing. Unlike in the related art, therefore, the imaging conditions are not required to be changed with the angle of view. Without time division over a plurality of imaging periods (fields), the target can be detected with a plurality of angles of view for all the imaging periods if required by the application.

Figure 5:
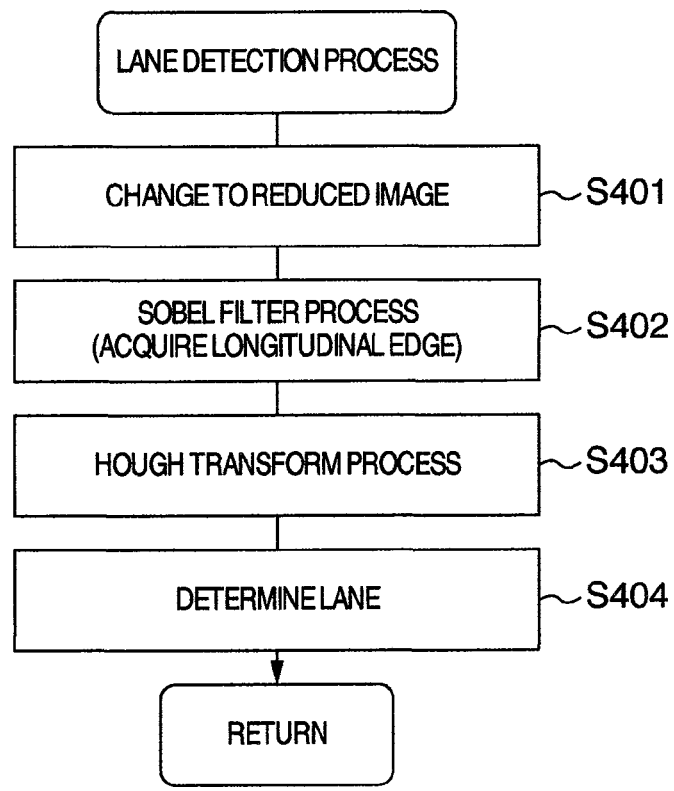
FIG. 5 is a flowchart for the lane detection process.
Figure 6:
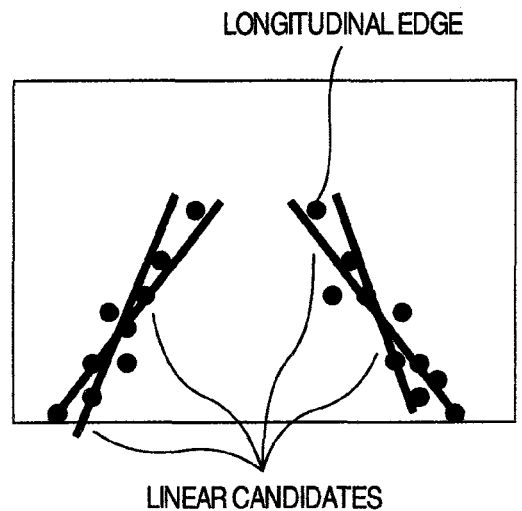
FIG. 6 shows an example of the result of linear candidate calculation by Hough transform.

FIG. 5 is a flowchart for the lane detection process. The image memory 206 has stored the images of 600×600 pixels therein. In step S401, the image data is removed for every other pixel in both horizontal and vertical directions using the function of the image processing unit 204 to reduce the processing load of the image recognition unit 205, and a new reduced image is stored in the image memory 206. The pixel removal interval may be widened in accordance with the processing ability of the image recognition unit 205. In step S402, because of the large edge component of each lane in longitudinal direction, the Sobel filter process is executed to acquire the longitudinal edge from the reduced image using the function of the image processing unit 204. Thus, the longitudinal edge image is generated and stored in the image memory 206. In step S403, the longitudinal edge image is subjected to the Hough transform to calculate a linear candidate. An example of the result of calculation of the linear candidate is shown in FIG. 6. In this example, two candidates of left lines and two candidates of right lines are indicated. In step S404, a lane is estimated from the linear candidates, and the amount of shift of the own vehicle from the lane center is calculated as the output result of the lane detection process. The peripheral circuits and the processing programs can be commonly used by setting the number of pixels of the image after image data reduction in accordance with the image processing at other angles of view.

Figure 7:
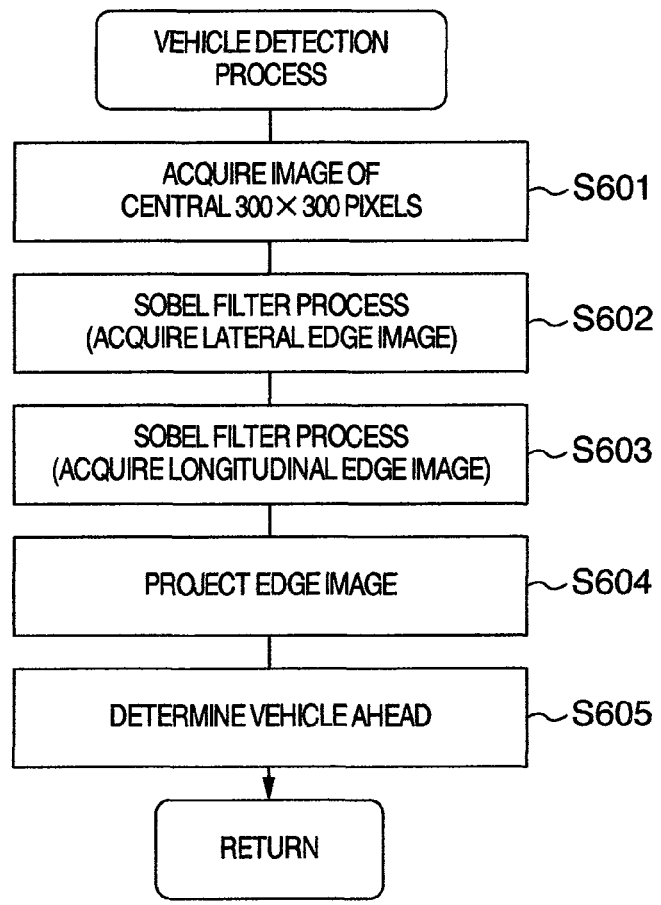
FIG. 7 is a flowchart for the vehicle detection process.
Figure 8A:
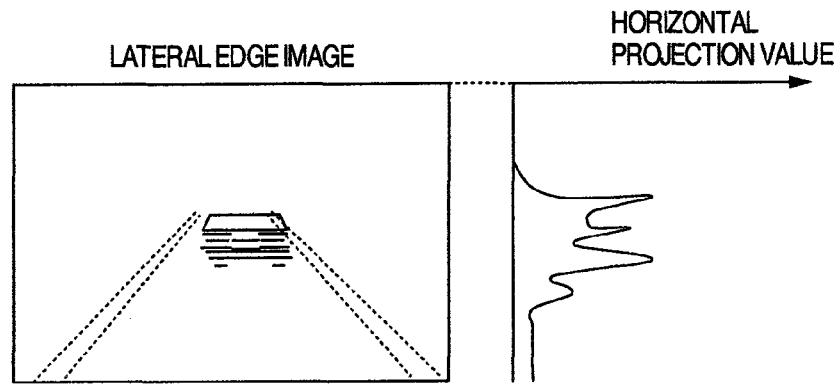
FIGS. 8A and 8B show an example of the vehicle detection process using the edge projection process.
Figure 8B:
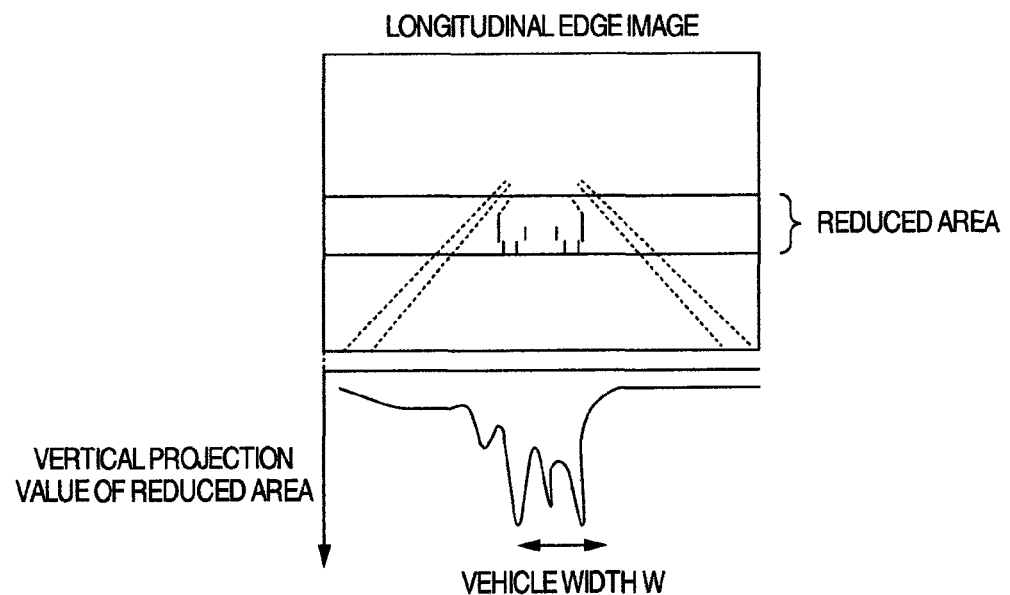

FIG. 7 is a flowchart for the vehicle detection process. The image memory 206 has stored therein an image of 600×600 pixels. In step S601, an image of 300×300 pixels corresponding to 30 degrees in angle of view is cut out from the central part of the image of 600×600 pixels thereby to generate an image with the angle of view at 30 degrees and store it in the image memory 206. Next, in step S602, the image with the angle of view at 30 degrees is subjected to the Sobel filter process using the function of the image processing unit 204 to acquire a lateral edge image, followed by step S603 in which the Sobel filter process to acquire a longitudinal edge image is executed using the function of the image processing unit 204. In step S604, the horizontal projection of the lateral edge image and the vertical projection of the longitudinal edge image are conducted. The result is shown in FIG. 8A. The presence of a vehicle ahead increases the horizontal projection value. Next, as shown in FIG. 8B, the vertical projection is conducted on the longitudinal edge image. In order to shorten the processing time and improve S/N between the data (signal component) on vehicles ahead and the remaining data (noise component), the vertical projection is conducted mainly for the area large in horizontal projection value. Using this result, step S605 estimates the vehicle ahead and calculates the distance to, direction and width W of the vehicle ahead as the output result of the vehicle detection process.

The aforementioned embodiment has the advantage that the lane detection process and the vehicle detection process involving different required angles of view can be executed at the same time for the same image.

Embodiments 2

Figure 9:
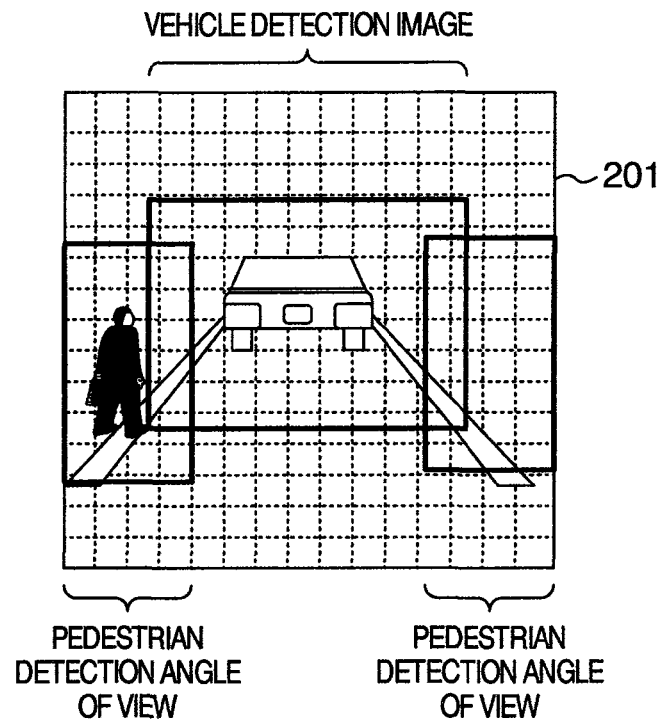
FIG. 9 shows an example of the angles of view for the vehicle detection process and the pedestrian detection process.

Now, another embodiment of this invention is explained. In the aforementioned embodiment, taking the lane detection process and the vehicle detection process as an example, the whole effective pixels are used for the vehicle detection process requiring a wide-angle image, while the central part of the effective pixels is used for the vehicle detection process requiring a narrow-angle image. The invention, however, is not limited to these processes, but the angle of view at which the image is cut out can be determined in accordance with a combination of applications. The configuration and processes not specifically explained are similar to those described in the aforementioned embodiment. FIG. 9 shows a case in which the vehicle detection process and the pedestrian detection process are executed. The vehicle detection process in which a vehicle far ahead of the own vehicle is required to be identified uses the image at the central part of the screen, while the pedestrian detection process in which the pedestrians on the left and right sides in the neighborhood of the own vehicle are required to be detected uses the images at the left and right ends of the neighborhood of the own vehicle.

Embodiment 3

Figure 10:
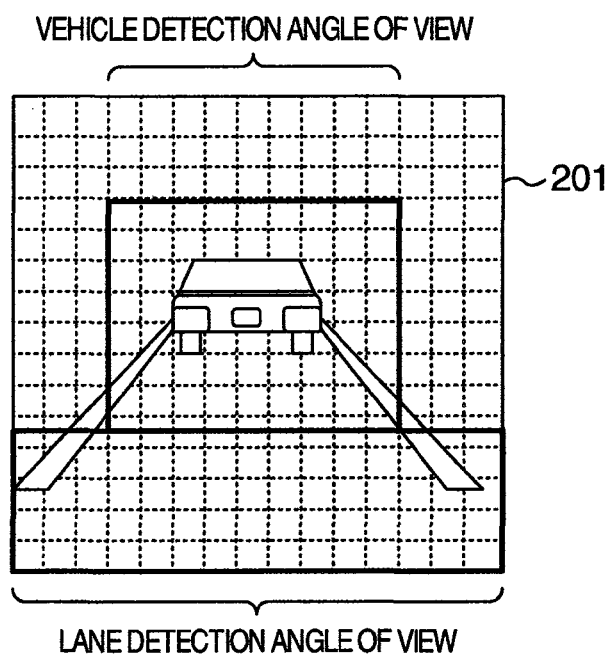
FIG. 10 shows an example of the angles of view for the vehicle detection process and the lane detection process.

FIG. 10 illustrates another embodiment in which the lane detection process and the vehicle detection process are executed. The configuration and processes not specifically explained below are similar to those of the aforementioned embodiments. The vehicle detection which requires identification of a vehicle running far ahead of the own vehicle uses the image at the central part of the screen, while the lane detection uses the image high in S/N in the neighborhood of the own vehicle. According to this embodiment, the information amount of the image used for lane detection can be reduced, thereby leading to the advantage of a reduced processing load on the image processing unit 204.

Embodiment 4

Figure 11:
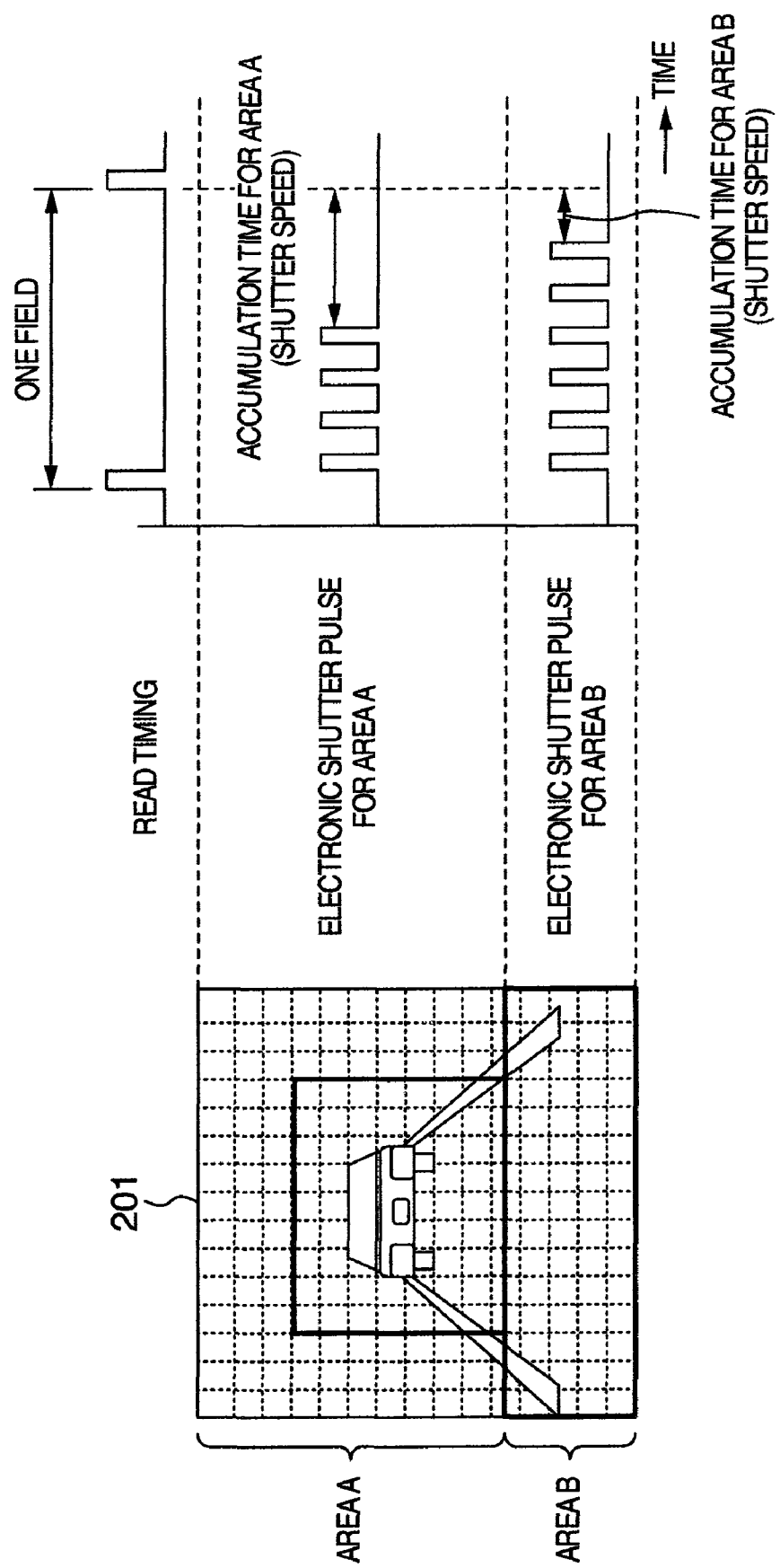
FIG. 11 is a diagram showing an example in which the electronic shutter pulse is changed for each area.

In the examples explained above, an image with the same shutter speed of the imaging device 201 is used for all applications. In view of the fact that the information on the area far from the own vehicle is critical for vehicle detection and the information on the neighborhood of the own vehicle for vehicle detection, however, the required shutter speed of the imaging device 201 may be varied between vehicle detection and lane detection. In the case where images of different shutter speeds are acquired for different applications, the time for image acquisition is increased with the number of applications, and the processing period is affected. FIG. 11 shows a case in which the vehicle detection area is arranged in the central part of the screen and the lane detection area arranged in the lower part of the screen in a manner not to be superposed one on the other. The image portion containing the vehicle detection area is designated as an area A, and the image portion containing the lane detection area as an area B. The areas A and B are supplied with different electronic shutter pulses from the imaging device control signal generating unit 203. According to this embodiment, the data of different shutter values can be acquired from the areas A and B in the same screen, and therefore, the contrast can be increased between lane and background and between vehicle ahead and background, thereby leading to the advantages of an improved detection accuracy and a shortened processing period.

As described above, different electronic shutter pulses are generated for different angles of view, and therefore, the shutter value can be changed for each screen. As a result, the contrast between a detection target different for each application and the background can be increased. Also, different detection targets for different applications can be detected with high accuracy, and therefore, the processing period can be shortened as compared with a case where the shutter value cannot be changed with screen.

Although the shutter pulse can be changed for each area in the aforementioned configuration, a configuration can alternatively be employed in which an image corresponding to an angle of view requiring the longest imaging period is acquired, and with regard to an angle of view sufficiently serving the purpose with a shorter than the particular imaging period, the image processing is carried out at the required timing. By doing so, an equivalent processing is made possible even in the case where the shutter pulse of the imaging device 201 cannot be changed for each area.

Figure 12A:
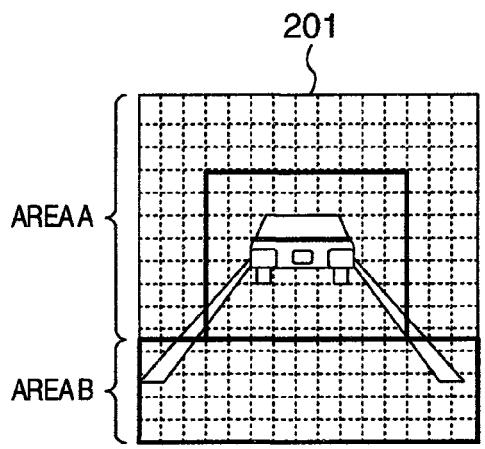
FIGS. 12A to 12C are diagrams showing an example in which the gamma correction is changed for each area.
Figure 12B:
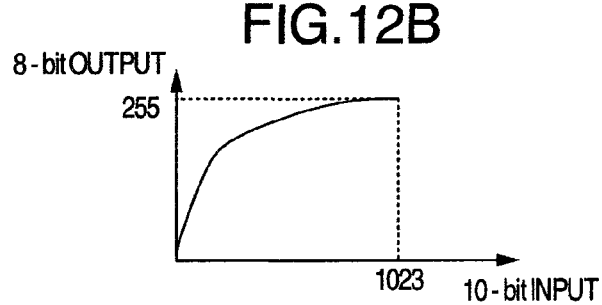
Figure 12C:
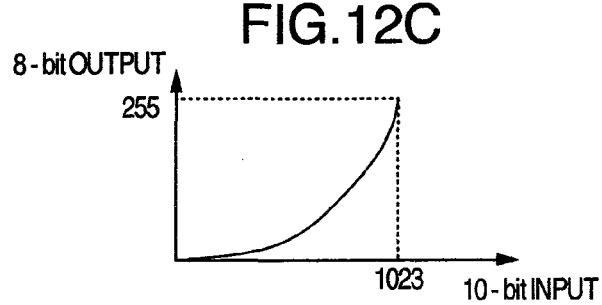

Further, like the shutter value, different characteristics of gamma correction may be better used for each application. FIGS. 12A to 12C show an example. Like in the case of FIG. 11, the image area containing the vehicle detection process is designated as an area A, and the image containing the lane detection area as an area B. The configuration and process not specifically explained are similar to those of the embodiment shown in FIG. 11. In the case where the vehicle running ahead is dense in color and located in a dark environment, the use of the gamma correction of a characteristic highlighting the (dark) portion small in brightness value can increase the contrast between the vehicle ahead and the environment. Further, in the case where the road portion in the area of the lane detection process is almost white, the use of the gamma correction of a characteristic highlighting the (bright) portion large in brightness value can increase the contrast between the lane and the road. This process is executed by the imaging device output signal converter 202. The analog data output from the imaging device 201 is converted into digital data of 10 bits, which in turn is converted into 8-bit data by gamma correction. In the process, the imaging device output signal converter 202 determines an area subjected to gamma correction, and carries out gamma correction of the area A in the case where the area A is determined, and the gamma correction of the area B in the case where the area B is determined.

As described above, different gamma corrections can be carried out for different screens not superposed one on another. Then, the contrast between each of different detection targets and the background can be increased for each application.

Figure 13A:
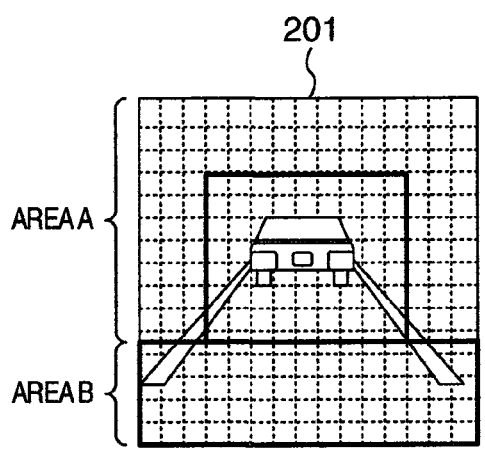
FIGS. 13A to 13C are diagrams showing an example in which the optical filter characteristic is changed for each area.
Figure 13B:
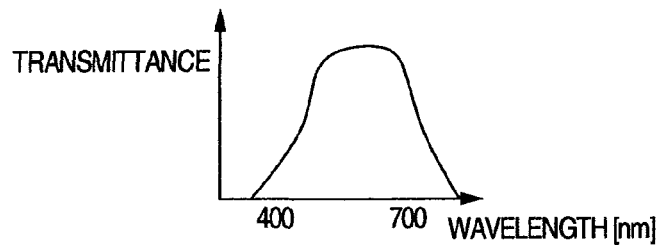
Figure 13C:
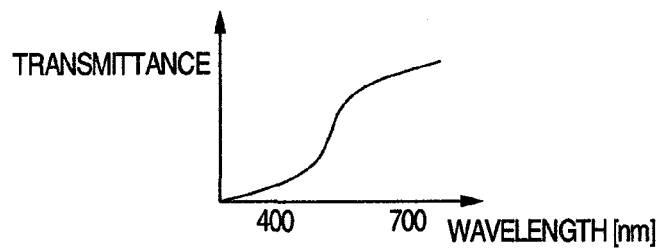

Further, like the shutter value and the gamma correction, it may be that optical filters of different characteristics may be better used for different applications. An example is shown in FIGS. 13A to 13C. In the case where the vehicle detection process recognizes the tail light portion, the acquisition of an image highlighting the red portion facilitates the detection of the tail light. Therefore, an optical filter having such a characteristic as to pass a greater amount of the light in the wavelength band of 650 nm to 700 nm is mounted in the area A of the imaging device 201. In the case where it is desired to detect a yellow line in similar fashion to a white line in the lane detection process, the contrast between the yellow line and the road is required to be increased to the same degree as the contrast between the white line and the road. For this purpose, a filter for masking the light having the wavelength of not more than 580 nm is mounted in the area B of the imaging device 201. This leads to the advantage that an image highlighting the tail light can be used for vehicle detection, and an image with the yellow and white lines having the same contrast can be used for lane detection.

As described above, optical filters of different characteristics are used at positions on the imaging device corresponding to the screens not superposed one on another, so that the contrast can be increased between a different detection target and the background for a different application. Also, a different detection target for a different application can be detected with high accuracy.

Although the area is divided into upper and lower parts in the aforementioned embodiments, this is only an example, and the area may be divided into more parts or into left and right parts, upper and lower parts or four parts including left, right, upper and lower parts with equal effect.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An on-vehicle camera comprising:
   an imaging unit including an imaging device and a lens; and
   a processing unit for processing an image picked up by an imaging unit;
   wherein the processing unit carries out an image processing for recognizing a lane at a first angle of view with respect to an image picked up by a given shutter, and an image processing for recognizing an obstacle at a second angle of view different from the first angle of view with respect to the same image, the image processing for recognizing the lane and the image processing for recognizing the obstacle being carried out in a same period.

2. The on-vehicle camera according to claim 1, wherein the first and second angles of view represent areas not superposed one on the other.

3. The on-vehicle camera according to claim 2, wherein the electronic shutter pulses are changeable between the first and second angles of view.

4. The on-vehicle camera according to claim 2, wherein the gamma correction is changeable between the first and second angles of view.

5. The on-vehicle camera according to claim 2, wherein the characteristic of the optical filter on the imaging device is changeable between the first and second angles of view.

* * * * *